United States Patent
Biallas

(10) Patent No.: US 7,445,079 B2
(45) Date of Patent: Nov. 4, 2008

(54) AUTOMATIC CALIBRATION OF VEHICLE TRANSMISSION USING LOAD SENSING

(75) Inventor: Jeffrey J. Biallas, Dexter, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 123 days.

(21) Appl. No.: 11/285,488

(22) Filed: Nov. 21, 2005

(65) Prior Publication Data
US 2007/0114091 A1    May 24, 2007

(51) Int. Cl.
*B60K 17/00* (2006.01)

(52) U.S. Cl. .......................... 180/338; 701/51; 701/55; 701/56

(58) Field of Classification Search ................ 180/338; 701/51, 52, 55, 56, 58, 65
See application file for complete search history.

(56) References Cited

U.S. PATENT DOCUMENTS

| | | | | |
|---|---|---|---|---|
| 4,788,892 A | * | 12/1988 | Komoda et al. | 477/120 |
| 4,854,194 A | * | 8/1989 | Kaneko et al. | 477/97 |
| 5,047,934 A | * | 9/1991 | Saito | 701/56 |
| 5,247,859 A | * | 9/1993 | Agusa et al. | 477/129 |
| 5,315,899 A | * | 5/1994 | Mochizuki | 477/119 |
| 5,678,453 A | * | 10/1997 | Dresden, III | 74/335 |
| 6,524,221 B2 | * | 2/2003 | Nishimura | 477/97 |
| 6,758,089 B2 | * | 7/2004 | Breed et al. | 73/146 |
| 6,819,994 B2 | * | 11/2004 | Shinohara et al. | 701/51 |
| 2003/0200016 A1 | * | 10/2003 | Spillane et al. | 701/36 |
| 2006/0064223 A1 | * | 3/2006 | Voss | 701/52 |

* cited by examiner

*Primary Examiner*—Paul N. Dickson
*Assistant Examiner*—Timothy Wilhelm

(57) ABSTRACT

A method for automatically calibrating a transmission of a vehicle using load sensing includes sensing a change in ride height of the vehicle and measuring a magnitude of the change in ride height of the vehicle. The method includes selecting a predefined set of parameters to calibrate the transmission depending on the magnitude of the change in ride height and calibrating the transmission using the selected predefined set of parameters.

8 Claims, 2 Drawing Sheets

AUTOMATIC CALIBRATION OF VEHICLE TRANSMISSION USING LOAD SENSING

FIELD OF THE INVENTION

The present invention relates to transmission control systems, and more particularly to automatically calibrating vehicle transmissions using load sensing.

BACKGROUND OF THE INVENTION

Calibrating an automatic transmission of a vehicle requires determining gear shift points, shift times, shift sequences, etc., for various conditions, such as changes in throttle position, load, altitude, temperature, etc., that the vehicle may encounter. A variety of vehicle system parameters, such as throttle position history, ride height, etc., may be used to calibrate a transmission of a vehicle.

A ride height of a vehicle is a distance between ground and a specified point on the chassis, suspension, or body of a vehicle. As a vehicle is loaded, the vehicle body lowers, and the vehicle suspension deflects. Thus, the ride height of a vehicle changes as the load changes. The ride height may also change when the road conditions change. For example, on a rough road, the ride height may change when the vehicle encounters bumps.

The changes in ride height can be measured by installing load sensors, such as ride height sensors, in the suspension of the vehicle. The ride height data is typically used in suspension control systems to improve ride comfort. For example, the sensor detects changes in the suspension height of a vehicle and sends a signal to a control module that raises or lowers the suspension to ensure a smoother, level ride. The ride height data, however, has not been used to automatically calibrate vehicle transmissions.

SUMMARY OF THE INVENTION

Accordingly, the present invention provides a method for automatically calibrating a transmission of a vehicle using load sensing, comprising sensing a change in ride height of the vehicle, measuring a magnitude of the change in ride height of the vehicle, selecting a predefined set of parameters to calibrate the transmission depending on the magnitude of the change in ride height, and calibrating the transmission using the selected predefined set of parameters.

In another feature, the method comprises defining a plurality of sets of parameters to calibrate the transmission of the vehicle.

In another feature, the method comprises defining a threshold for the magnitude of the change in ride height of the vehicle.

In still another feature, the method comprises determining whether the magnitude of the change in ride height exceeds a predefined threshold.

In another feature, the method comprises, selectively displaying ride height and the magnitude of the change in ride height of the vehicle to indicate unsafe and overloaded vehicle conditions.

In another feature, the method comprises selectively calibrating the transmission manually.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
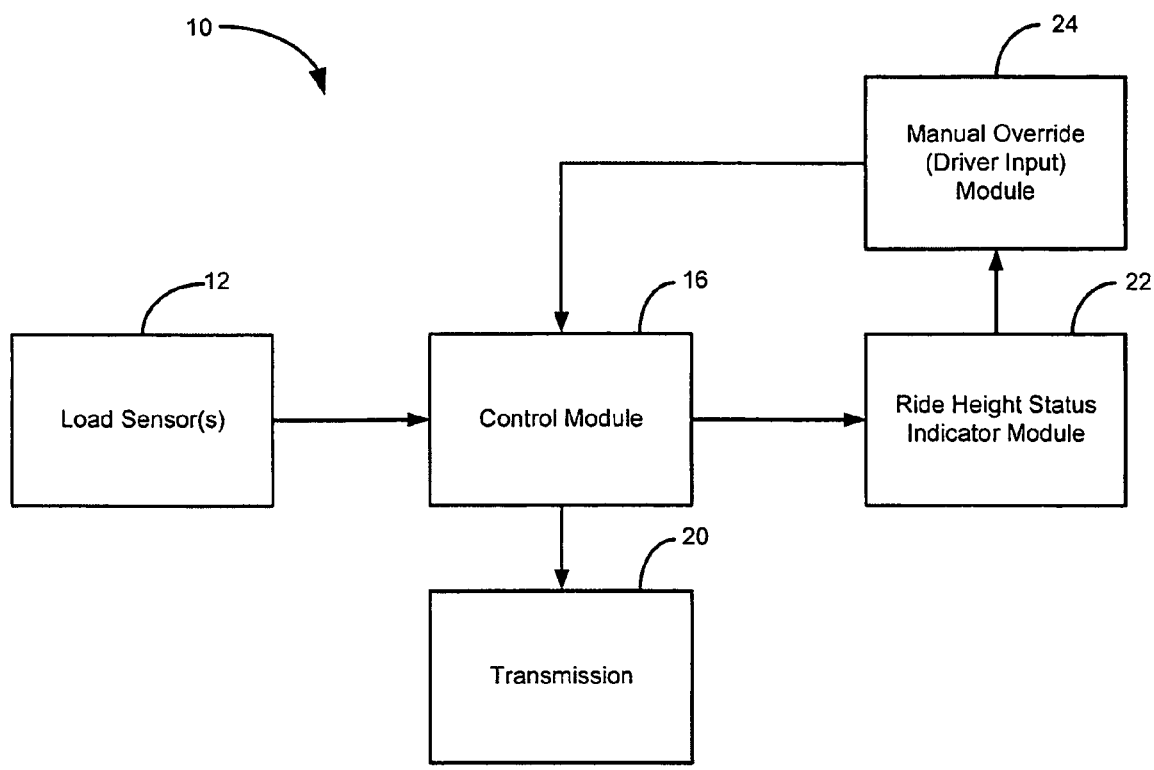
FIG. 1 is a functional block diagram illustrating an exemplary control system for automatically calibrating a transmission of a vehicle according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module, controller and/or device refers to an application specific integrated circuit (ASIC), an electronic circuit, a processor (shared, dedicated, or group) and memory that execute one or more software or firmware programs, a combinational logic circuit, and other suitable components that provide the described functionality.

Referring now to FIG. 1, a system 10 for automatically calibrating a transmission of a vehicle using load sensing is shown. The system 10 includes at least one load sensor 12, such as a ride height sensor, installed in the suspension of a vehicle (not shown). The sensor 12 detects a change in the ride height of the vehicle when the load and road conditions vary.

A control module 16 measures the magnitude of the change in ride height detected by the sensor 12. The control module 16 compares the magnitude of the change in ride height to a predefined threshold that is stored in the memory (not shown) in the control module 16. When the magnitude of the change in ride height exceeds the predefined threshold, a change in calibration is necessary, and depending on the magnitude of the change in ride height, the control module 16 selects one of the predefined sets of parameters, or shift maps, to calibrate the transmission 20 of the vehicle.

The parameters in a shift map control different functions of a transmission 20 such as gear shift times, shift schedules, etc. These parameters are defined by a calibrator (not shown) when the transmission 20 is manufactured and calibrated for various conditions, such as changes in throttle position, load, altitude, temperature etc. Notably, the calibration of a transmission can be effected in the form of step or variable control changes. The parameter values in the shift maps can be defined accordingly. The shift maps are stored in the memory in the control module 16 in the form of look-up tables.

The control module 16 uses the parameters in the selected shift map and calibrates the transmission 20 by modifying gear shift time, shift sequence, etc., according to the parameter values in the shift map.

Optionally, the control system 10 provides an indicator module 22 that displays the ride height information for the driver of the vehicle. This feature can be useful in some situations. For example, the ride height status indicator can warn the driver of an unsafe or overloaded vehicle condition.

The control system 10 also provides an optional manual override module 24 that allows the driver to override the automatic calibration control and manually input the desired calibration parameters. This feature can be useful in some situations. For example, when the vehicle pulls a load such as a trailer, the load does not vertically compress the suspension.

Consequently, the ride height does not change proportionally to the load pulled. As a result, the automatic calibration may not function properly and manual calibration may be preferred. Mountainous driving is another example where the manual calibration option may be desirable.

Figure 2:
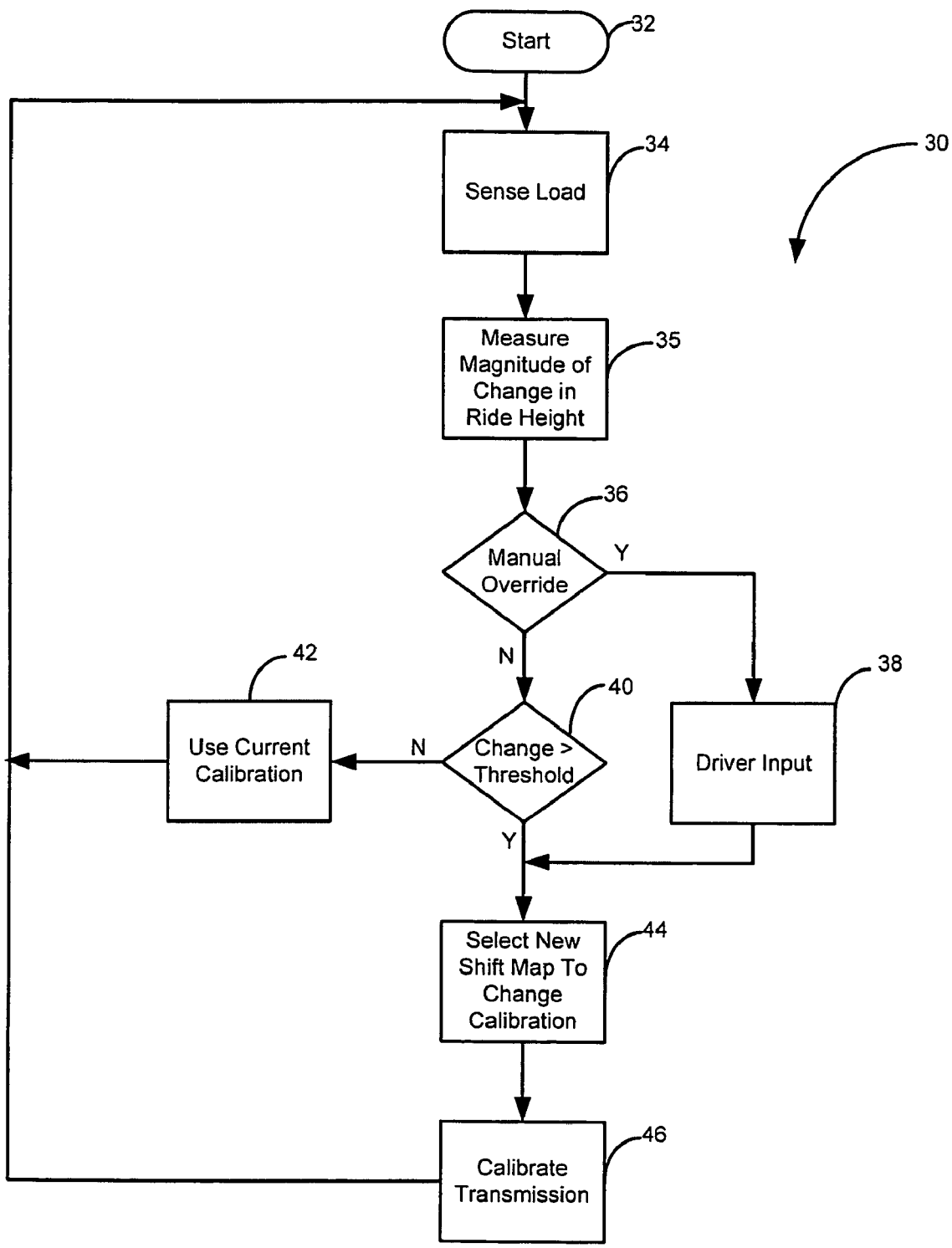
FIG. 2 is a flowchart illustrating an exemplary method for automatically calibrating a transmission of a vehicle according to the present invention.

Referring now to FIG. 2, a method 30 for automatically calibrating a transmission of a vehicle using load sensing is shown. The method 30 begins at step 32. In step 34, a load sensor 12, such as a ride height sensor, detects a change in the ride height of a vehicle when the load and road conditions vary. In step 35, a control module measures the magnitude of the change in ride height.

In step 36, the control module 16 checks whether manual override control 24 is in use. If the manual override control 24 is in use, the control system 10 does not automatically control the calibration of transmission 20. Instead, in step 38, the driver of the vehicle manually inputs the desired calibration selection to control the operation of the transmission 20.

If, however, the manual override control 24 is not in use, then in step 40, the control module 16 checks whether the magnitude of the change in ride height exceeds a predefined threshold. If the magnitude of the change in ride height is less than the threshold, then a change in calibration is not necessary, and in step 42, the control module 16 continues to operate the transmission 20 using current calibration.

If, however, the magnitude of the change in ride height exceeds the threshold, then a change in calibration is necessary, and in step 44, the control module 16 selects a new set of calibration parameters, or a new shift map, from a shift map look-up table stored in the memory in the control module 16. The control module 16 selects the shift map depending on the magnitude of the change in ride height or depending on the calibration selection manually input by the driver.

In step 46, the control module 16 calibrates the transmission 20 using the parameter values in the selected shift map by modifying gear shift time, shift sequence, etc., according to the parameter values in the selected shift map.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification, and the following claims.

What is claimed is:

1. A method for automatically calibrating a transmission of a vehicle using load sensing, comprising:
   sensing a change in ride height of the vehicle;
   measuring a magnitude of the change in ride height of the vehicle;
   selecting a predefined set of parameters to calibrate the transmission depending on the magnitude of the change in ride height;
   calibrating the transmission using the selected predefined set of parameters; and
   selectively displaying ride height and the magnitude of the chance in ride height of the vehicle to indicate unsafe and overloaded vehicle conditions.

2. The method of claim 1 further comprising defining a plurality of sets of parameters to calibrate the transmission of the vehicle.

3. The method of claim 1 further comprising defining a threshold for the magnitude of the change in ride height of the vehicle.

4. The method of claim 1 further comprising determining whether the magnitude of the change in ride height exceeds a predefined threshold.

5. The method of claim 1 further comprising selectively calibrating the transmission manually.

6. A system for automatically calibrating a transmission of a vehicle using load sensing, comprising:
   a sensor that detects a change in ride height of the vehicle while the vehicle is stationary;
   a control module that measures a magnitude of the change in ride height of the stationary vehicle and depending on said magnitude selects one of a plurality of predefined sets of parameters to calibrate the transmission of the vehicle when said magnitude exceeds a predefined threshold; and
   an indicator module that selectively displays ride height and the magnitude of the change in ride height of the vehicle to indicate unsafe and overloaded vehicle conditions.

7. The system of claim 6 wherein the control module calibrates the transmission of the vehicle using the selected parameters.

8. The system of claim 6 further comprising a manual override module that selectively enables manual calibration of the transmission.

* * * * *